United States Patent
Takiguchi et al.

(10) Patent No.: US 10,953,681 B2
(45) Date of Patent: Mar. 23, 2021

(54) INK JET COMPOSITION AND RECORDED MATTER

(71) Applicant: Seiko Epson Corporation, Tokyo (JP)

(72) Inventors: Hiroshi Takiguchi, Matsumoto (JP); Hiroaki Kida, Shiojiri (JP); Shintaro Asai, Matsumoto (JP); Masaru Terada, Suwa (JP); Naoyuki Toyoda, Suwa (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/367,604

(22) Filed: Mar. 28, 2019

(65) Prior Publication Data
US 2019/0300733 A1 Oct. 3, 2019

(30) Foreign Application Priority Data
Mar. 29, 2018 (JP) .............................. JP2018-063936

(51) Int. Cl.
  *B41M 5/50* (2006.01)
  *B41M 5/52* (2006.01)
(52) U.S. Cl.
  CPC ............ *B41M 5/5218* (2013.01); *B41M 5/52* (2013.01); *B41M 5/529* (2013.01); *Y10T 428/24909* (2015.01)
(58) Field of Classification Search
  CPC ............ C09D 11/30; Y10T 428/24909; Y10T 428/265; B41M 5/5218; B41M 5/52; B41M 5/529

USPC ......................................................... 428/208
See application file for complete search history.

(56) References Cited

U.S. PATENT DOCUMENTS

| | | | |
|---|---|---|---|
| 2005/0190244 A1* | 9/2005 | Tyrell ................... | C09D 11/324 347/100 |
| 2013/0196127 A1* | 8/2013 | Toyoda .................. | C09D 11/14 428/208 |
| 2017/0058138 A1 | 3/2017 | Kida et al. | |

FOREIGN PATENT DOCUMENTS

| EP | 2 623 569 A1 | 8/2013 |
|---|---|---|
| JP | 2007-161844 A | 6/2007 |
| JP | 2017-043772 A | 3/2017 |

OTHER PUBLICATIONS

Extended European Search Report for Application No. EP 19 16 6393 dated Aug. 6, 2019 (5 pages).
Extended European Search Report for Application No. EP 19 16 6394 dated Aug. 2, 2019 (5 pages).

* cited by examiner

*Primary Examiner* — Betelhem Shewareged
(74) *Attorney, Agent, or Firm* — Harness, Dickey & Pierce, P.L.C.

(57) ABSTRACT

An ink jet composition of the invention is discharged by an ink jet method and includes: metal powder; an organic solvent; and a resin having a styrene-maleic acid structure as a binder resin, in which the ink jet composition contains metal powder surface-treated with a fluorine-based compound as the metal powder.

18 Claims, No Drawings

INK JET COMPOSITION AND RECORDED MATTER

BACKGROUND

1. Technical Field

The present invention relates to an ink jet composition and a recorded matter.

2. Related Art

In the related art, metal plating, foil press printing using metal foil, heat transferring using metal foil, or the like has been adopted as a method for manufacturing an ornament exhibiting a glossy appearance.

However, in these methods, there is a problem in that it is difficult to form a fine pattern or to apply the methods to a curved surface portion. In addition, in the foil press printing, there is a problem in that it is impossible to print metallic tones with gradation, which has a low on-demand property and in which it is difficult to cope with multiproduct production.

On the other hand, a recording method performed through an ink jet method is used as a method for recording on a recording medium with a composition containing a pigment or a dye. The ink jet method is excellent in that it can also be suitably applied to formation of a fine pattern and recording on a curved surface portion. A composition (ink jet composition) obtained by dispersing or dissolving a coloring agent (a pigment or a dye) in an organic solvent is used (for example, refer to JP-A-2007-161844) since it is advantageous particularly in that a thickness of a printed layer can be reduced and occurrence of unnecessary feeling of unevenness can be suitably prevented.

However, in the ink jet composition, when metal powder is applied instead of a pigment or a dye, there is a problem in that it is impossible to sufficiently exhibit characteristics such as a glossy feeling originally possessed by metal. In addition, a problem such as deterioration in discharge stability due to an increase in viscosity is caused. In addition, there is also a problem in that adhesiveness of a recorded portion (printed portion), to be formed using the composition, to a recording medium is inferior.

SUMMARY

The invention can be realized in the following application examples.

According to an application example of the invention, there is provided an ink jet composition discharged by an ink jet method, including: metal powder; an organic solvent; and a resin having a styrene-maleic acid structure as a binder resin, in which the ink jet composition contains metal powder surface-treated with a fluorine-based compound as the metal powder.

DESCRIPTION OF EXEMPLARY EMBODIMENTS

Hereinafter, suitable embodiments of the invention will be described.

Ink Jet Composition

First, an ink jet composition of the invention will be described.

An ink jet composition of the invention is discharged by an ink jet method and includes: metal powder; an organic solvent; and a resin having a styrene-maleic acid structure as a binder resin, in which the ink jet composition contains metal powder surface-treated with a fluorine-based compound as the metal powder.

Accordingly, it is possible to make the metal powder in the ink jet composition have excellent chemical stability and dispersion stability and make the ink jet composition have excellent discharge stability over a long period of time. In addition, in a recorded matter produced using the ink jet composition, it is possible to sufficiently exhibit characteristics such as a glossy feeling originally possessed by a metal material forming metal powder. In addition, in the recorded matter produced using the ink jet composition, it is possible to make a printed portion have excellent adhesiveness to a recording medium and make the recorded matter have excellent durability. Particularly when metal powder surface-treated with a fluorine-based compound is simply contained in an ink jet composition for the purpose of enhancing dispersibility or the like of metal powder in the ink jet composition, a problem such as deterioration in adhesiveness of the printed portion remarkably occurs in the recorded matter produced using the ink jet composition. However, according to the invention, it is possible to make the printed portion, formed using the ink jet composition, have excellent adhesiveness to a recording medium while enjoying benefits caused by surface treatment of metal powder with a fluorine-based compound and to make the recorded matter have excellent durability. In addition, even when an organic solvent having low surface tension is used as a constituent material of the ink jet composition, it is possible to suitably arrange (leaf) metal powder reliably in the vicinity of the outer surface of the printed portion of the recorded matter produced using the ink jet composition and to sufficiently exhibit characteristics such as a glossy feeling originally possessed by a metal material forming the metal powder. Accordingly, the range of selection of organic solvents is widened, and the characteristics of the ink jet composition or the characteristics of the recorded matter produced using the ink jet composition (for example, the viscosity, the storage stability, and the discharge stability of the ink jet composition) can be easily adjusted without sacrificing the glossy feeling originally possessed by a metal material.

Metal Powder

As described above, the ink jet composition of the invention contains metal powder surface-treated with a fluorine-based compound as the metal powder.

Base Particles

First, base particles constituting metal particles (particles subjected to the surface treatment with a fluorine-based compound) will be described.

The base particles constituting metal powder may be at least those in which a region including the vicinity of the surface is made of a metal material. For example, the base particles may be entirely made of a metal material, and may include a base portion made of a non-metal material and a coating layer made of a metal material covering the base portion.

Metal as a simple substance, various alloys, or the like can be used as the metal material constituting the base particles.

In particular, it is preferable that at least the vicinity of the surfaces of the base particles be mainly formed of Al. Al hardly causes a problem such as precipitation due to its low specific gravity among various metal materials, and therefore, it exhibits a superior glossy feeling. The present inventors have found that when powder formed of Al is attempted to be applied to the ink jet composition, storage stability of the ink jet composition particularly deteriorate by change over time due to oxidation and a problem such as deterioration in discharge stability due to increase in viscosity particularly remarkably occurs. In contrast, in the invention, it is possible to reliably prevent the occurrence of the above-described problem even when powder of which the surface is formed of Al is used. That is, the effect of the invention is particularly remarkably exhibited when the metal powder constituting the ink jet composition is obtained by surface-treating powder, of which at least a surface is mainly formed of Al, with the fluorine-based compound.

In addition, the base particles may be produced through any method, but can be produced, for example, by forming a film made of a metal material through a vapor phase film formation method, and then pulverizing the film.

Accordingly, it is possible to more effectively express a glossy feeling or the like, originally possessed by a metal material, in a pattern (printed portion) formed using the ink jet composition of the invention. In addition, it is possible to suppress variation in characteristics among particles. In addition, it is possible to suitably produce base particles through the method even with relatively thin metal powder.

When base particles are produced through such a method, it is possible to suitably produce base particles, for example, by forming a film made of a metal material on a base material.

It is possible to use, for example, a plastic film of polyethylene terephthalate or the like as the base material. In addition, the base material may have a releasing agent layer on a film deposition surface.

The pulverization may be performed by applying ultrasonic vibration to the film in a liquid.

Accordingly, it is possible to easily and reliably obtain base particles having a particle diameter as will be described later and to suppress occurrence of variation in size, shape, and characteristics among the particles.

When pulverization is performed through the above-described method, alcohols such as methanol, ethanol, propanol, and butanol, hydrocarbon-based compounds such as n-heptane, n-octane, decane, dodecane, tetradecane, toluene, xylene, cymene, durene, indene, dipentene, tetrahydronaphthalene, decahydronaphthalene, and cyclohexylbenzene, carboxylic acid ester compounds such as ethyl acetate and butyl acetate, ester-based compounds such as ethylene glycol methyl ether, ethylene glycol diethyl ether, ethylene glycol methyl ethyl ether, diethylene glycol dimethyl ether, diethylene glycol diethyl ether, diethylene glycol methyl ethyl ether, propylene glycol methyl ether acetate, dipropylene glycol methyl ether acetate, ethylene glycol butyl ether acetate, ethylene glycol ethyl ether acetate, diethylene glycol monobutyl ether acetate, diethylene glycol n-butyl ether, tripropylene glycol dimethyl ether, triethylene glycol diethyl ether, tetraethylene glycol dimethyl ether, tetraethylene glycol dibutyl ether, tetraethylene glycol monobutyl ether, 1,2-dimethoxyethane, bis(2-methoxyethyl) ether, and p-dioxane, and polar compounds such as propylene carbonate, γ-butyrolactone, N-methyl-2-pyrrolidone, N,N-dimethylformamide (DMF), N,N-dimethylacetamide (DMA), dimethyl sulfoxide, cyclohexanone, and acetonitrile, can be suitably used as the liquid. By using such a liquid, it is possible to make base particles and metal powder have superior productivity while preventing unwilling oxidation or the like of the base particles and to particularly reduce the variation in size, shape, and characteristics among the particles.

For example, base particles commercially available as metal pigments (aluminum pigments and the like) may be used as the base particles. A paste-like composition containing metal powder is included in such a commercially available product. Examples the commercially available composition containing metal powder include Metasheen 11-0010, Metasheen 41-0010, and Metasheen 71-0010 (all are manufactured by BASF SE).

Fluorine-Based Compound

As described above, metal powder surface-treated with a fluorine-based compound is included.

When the metal powder is surface-treated with a fluorine-based compound in this manner, an excellent synergistic effect as described above in combination with an effect obtained by containing a resin having a styrene-maleic acid structure to be described in detail below.

Examples of the fluorine-based compound (surface treatment agent) for surface-modifying base particles include fluorine-based silane compound and a fluorine-based phosphate compound, and a fluorine-based phosphate compound is preferable.

Accordingly, it is possible to make the ink jet composition have superior storage stability and discharge stability over a long period of time and to make a printed portion of the recorded matter produced using the ink jet composition have superior glossy feeling and adhesiveness to a recording medium.

A silane compound having at least one fluorine atom in a molecule can be used as the fluorine-based silane compound.

In particular, it is preferable that the fluorine-based silane compound as a surface treatment agent have a chemical structure represented by Formula (4).

$$R^1SiX^1_aR^2_{(3-a)} \quad (4)$$

(In Formula (4), $R^1$ represents a hydrocarbon group in which a part or all of hydrogen atoms are substituted with fluorine atoms, $X^1$ represents a hydrolyzable group, an ether group, a chloro group, or a hydroxyl group, $R^2$ represents an alkyl group having 1 to 4 carbon atoms, and a represents an integer of 1 to 3.)

Examples of $R^1$ in Formula (4) include an alkyl group, an alkenyl group, an aryl group, and an aralkyl group in which a part or all of hydrogen atoms are substituted with fluorine atoms. At least a part of hydrogen atoms (hydrogen atoms not substituted with fluorine atoms) included in a molecular structure may be further substituted with an amino group, a carboxyl group, a hydroxyl group, a thiol group, or the like, and heteroatoms such as —O—, —S—, —NH—, and —N= or aromatic rings such as benzene may be interposed between carbon chains. Specific examples of $R^1$ include a phenyl group, a benzyl group, a phenethyl group, a hydroxyphenyl group, a chlorophenyl group, an aminophenyl group, a naphthyl group, an anthrenyl group, a pyrenyl group, a thienyl group, a pyrrolyl group, a cyclohexyl group, a cyclohexenyl group, a cyclopentyl group, a cyclopentenyl group, a pyridinyl group, a methyl group, an ethyl group, an n-propyl group, an isopropyl group, an n-butyl group, an isobutyl group, an sec-butyl group, a tert-butyl group, an octadecyl group, an n-octyl group, a chloromethyl group, a methoxyethyl group, a hydroxyethyl group, an aminoethyl group, a cyano group, a mercaptopropyl group, a vinyl group, an allyl group, an acryloxyethyl group, a methacryloxyethyl group, a glycidoxypropyl group, and an acetoxy group in which a part or all of hydrogen atoms are substituted with fluorine atoms.

In addition, the fluorine-based silane compound preferably has a perfluoroalkyl structure $(C_nF_{2n+1})$.

An example of the fluorine-based silane compound having a perfluoroalkyl structure ($C_nF_{2n+1}$) includes a fluorine-based silane compound represented by Formula (5).

$$C_nF_{2n+1}(CH_2)_mSiX^1{}_aR^2{}_{(3-a)} \quad (5)$$

(In Formula (5), $X^1$ represents a hydrolyzable group, an ether group, a chloro group, or a hydroxyl group, $R^2$ represents an alkyl group having 1 to 4 carbon atoms, n represents an integer of 1 to 14, m represents an integer of 2 to 6, and a represents an integer of 1 to 3.)

Specific examples of the compound having such a structure include $CF_3$—$CH_2CH_2$—$Si(OCH_3)_3$, $CF_3(CF_2)_3$—$CH_2CH_2$—$Si(OCH_3)_3$, $CF_3(CF_2)_5$—$CH_2CH_2$—$Si(OCH_3)_3$, $CF_3(CF_2)_5$—$CH_2CH_2$—$Si(OC_2H_5)_3$, $CF_3(CF_2)_7$—$CH_2CH_2$—$Si(OCH_3)_3$, $CF_3(CF_2)_{11}$—$CH_2CH_2$—$Si(OC_2H_5)_3$, $CF_3(CF_2)_3$—$CH_2CH_2$—$Si(CH_3)(OCH_3)_2$, $CF_3(CF_2)_7$—$CH_2CH_2$—$Si(CH_3)(OCH_3)_2$, $CF_3(CF_2)_8$—$CH_2CH_2$—$Si(CH_3)(OC_2H_5)_2$, and $CF_3(CF_2)_8$—$CH_2CH_2$—$Si(C_2H_5)(OC_2H_5)_2$.

In addition, a fluorine-based silane compound having a perfluoroalkyl ether structure ($C_nF_{2n+1}O$) instead of the above-described perfluoroalkyl structure ($C_nF_{2n+1}$) can be used as the fluorine-based silane compound.

An example of the fluorine-based silane compound having a perfluoroalkyl ether structure ($C_nF_{2n+1}O$) includes a fluorine-based silane compound represented by Formula (6).

$$C_pF_{2p+1}O(C_qF_{2q}O)_r(CH_2)_mSiX_{1a}R^2{}_{(3-a)} \quad (6)$$

(In Formula (6), $X^1$ represents a hydrolyzable group, an ether group, a chloro group, or a hydroxyl group, $R^2$ represents an alkyl group having 1 to 4 carbon atoms, p represents an integer of 1 to 4, q represents an integer of 1 to 4, r represents an integer of 1 to 10, m represents an integer of 2 to 6, and a represents an integer of 1 to 3.)

Specific examples of the compound having such a structure include $CF_3O(CF_2O)_6$—$CH_2CH_2$—$Si(OC_2H_5)_3$, $CF_3O(C_3F_6O)_4$—$CH_2CH_2$—$Si(OCH_3)_3$, $CF_3O(C_3F_6O)_2$—$(CF_2O)_3$—$CH_2CH_2$—$Si(OCH_3)_3$, $CF_3O(C_3F_6O)_8$—$CH_2CH_2$—$Si(OCH_3)_3$, $CF_3O(C_4F_9O)_5$—$CH_2CH_2$—$Si(OCH_3)_3$, $CF_3O(C_4F_9O)_5$—$CH_2CH_2$—$Si(CH_3)(OC_2H_5)_2$, and $CF_3O(C_3F_6O)_4$—$CH_2CH_2$—$Si(C_2H_5)(OCH_3)_2$.

A derivative of phosphoric acid having a fluorine atom in a molecule can be used as the fluorine-based phosphate compound.

In particular, it is preferable that the fluorine-based phosphate compound have a chemical structure represented by Formula (1).

$$POR_n(OH)_{3-n} \quad (1)$$

(In Formula (1), R represents $CF_3(CF_2)_m$—, $CF_3(CF_2)_m(CH_2)_l$—, $CF_3(CF_2)_m(CH_2O)_l$—, $CF_3(CF_2)_m(CH_2CH_2O)_l$—, $CF_3(CF_2)_mO$—, or $CF_3(CF_2)_m(CH_2)_lO$—, n represents an integer of 1 to 3, m represents an integer of 3 to 17, and l represents an integer of 1 to 12.)

Accordingly, it is possible to make the ink jet composition have superior storage stability and discharge stability over a long period of time and to make a printed portion of the recorded matter produced using the ink jet composition have superior glossy feeling and adhesiveness to a recording medium.

In Formula (1), m is preferably an integer of 3 to 17 and more preferably an integer of 3 to 7.

Accordingly, the above-described effect is more remarkably exhibited.

In addition, in Formula (1), l is preferably an integer of 1 to 12 and more preferably an integer of 2 to 10.

Accordingly, the above-described effect is more remarkably exhibited.

In addition, the fluorine-based phosphate compound may be at least one of $CF_3(CF_2)_5(CH_2)_2P(O)(OH)_2$ and $CF_3(CF_2)_3(CH_2)_2P(O)(OH)_2$.

Accordingly, it is possible to make the ink jet composition have superior storage stability and discharge stability over a long period of time and to make a printed portion of the recorded matter produced using the ink jet composition have superior glossy feeling, adhesiveness to a recording medium, and weather resistance over time.

In addition, when the fluorine-based phosphate compound has a perfluoroalkyl structure ($C_nF_{2n+1}$), it is possible to make the ink jet composition have superior storage stability and discharge stability over a long period of time and to make a printed portion of the recorded matter produced using the ink jet composition have a superior glossy feeling and weather resistance over time.

Surface treatment on base particles using the above-described fluorine-based compound is usually performed by bringing the fluorine-based compound into contact with base particles in a heating environment.

The contact between base particles and the fluorine-based compound is preferably performed in a dispersion liquid containing base particles.

Accordingly, it is possible to more suitably bring the base particles and the fluorine-based compound into contact with each other. Therefore, it is possible to improve productivity of metal powder and more effectively prevent occurrence of unwilling variation in the degree of surface treatment using the fluorine-based compound in moieties of the base particles.

When the base particles and the fluorine-based compound are brought into contact with each other in a dispersion liquid containing the base particles, it is possible to use, for example, alcohol compounds (monohydric alcohols such as methyl alcohol, ethyl alcohol, propyl alcohol, butyl alcohol, and isopropyl alcohol or polyhydric alcohols such as ethylene glycol and glycerin, and fluorides thereof) ketone compounds (acetone, methyl ethyl ketone, cyclohexanone, and the like), carboxylic acid ester compounds (methyl acetate, ethyl acetate, propyl acetate, butyl acetate, methyl propionate, ethyl propionate, and the like), ether compounds (diethyl ether, dipropyl ether, tetrahydrofuran, dioxane, and the like), and lactone compounds as a dispersion medium of the dispersion liquid. Among these, a dispersion medium containing one kind or two or more kinds selected from the group consisting of diethylene glycol dimethyl ether, diethylene glycol diethyl ether, tetraethylene glycol dimethyl ether, tetraethylene glycol dibutyl ether, tetraethylene glycol monobutyl ether, and γ-butyrolactone is preferable.

The temperature (treatment temperature) when performing surface treatment of the base particles with the fluorine-based compound is not particularly limited, but it is preferably 10° C. to 75° C., more preferably 15° C. to 70° C., and still more preferably 40° C. to 60° C.

Accordingly, it is possible to more suitably form a bond between the base particles and the fluorine-based compound. Therefore, it is possible to improve productivity of metal powder and more effectively prevent unwilling deterioration in materials.

The amount of fluorine-based compound used when performing surface treatment of the base particles with the fluorine-based compound is not particularly limited, but is preferably 2.0 parts by mass to 10 parts by mass and more preferably 3.0 parts by mass to 6.0 parts by mass, with respect to 100 parts by mass of the base particles.

Accordingly, it is possible to subject the base particles to surface treatment at a more suitable ratio, and the above-described effect is more remarkably exhibited.

On the other hand, when the amount of fluorine-based compound used is too small, there is a possibility that it may be difficult to make a printed portion of the recorded matter produced using the ink jet composition have a sufficiently excellent glossy feeling depending, for example, on the composition, the content rate of a resin having a styrene-maleic acid structure.

In addition, when the amount of fluorine-based compound used is too large, the amount of fluorine-based compound released without being bonded to the base particles in the ink jet composition increases. Therefore, there is a possibility that the discharge stability of the ink jet composition may deteriorate or the adhesiveness of the printed portion of the recorded matter to a recording medium may deteriorate.

The above-described fluorine-based compound (particularly fluorine-based phosphate compound) may be used for directly treating base particles, but it is preferable that base particles be treated using a fluorine-based compound after being subjected to acid or base treatment.

Accordingly, it is possible to more reliably modify the surface of a base particle through chemical bonding using a fluorine-based compound and to more effectively exhibit the effect using the above-described invention.

In addition, even when an oxide film is formed on the surfaces of particles as base particles before performing surface treatment with a fluorine-based compound, it is possible to reliably remove the oxide film and to perform the surface treatment with a fluorine-based compound in a state where the oxide film is removed. Therefore, it is possible to make metal powder to be produced have a superior glossy feeling.

It is possible to use, for example, proton acids such as hydrochloric acid, sulfuric acid, phosphoric acid, nitric acid, boric acid, acetic acid, carbonic acid, formic acid, benzoic acid, chlorous acid, hypochlorous acid, sulfurous acid, hyposulfurous acid, nitrous acid, hyponitrous acid, phosphorous acid, and hypophosphorous acid, and other protonic acids can be used as acids. Among these, hydrochloric acid, phosphoric acid, and acetic acid are suitable.

On the other hand, it is possible to use, for example, sodium hydroxide, potassium hydroxide, and calcium hydroxide as bases. Among these, sodium hydroxide and potassium hydroxide are suitable.

The metal powder may have any shape such as a spherical shape, a spindle shape, and a needle shape, but preferably has a scale shape.

Accordingly, it is possible to arrange the metal powder on a recording medium to which the ink jet composition is to be applied so that the main surface of the metal powder conforms to the shape of the surface of the recording medium. Therefore, it is possible to more effectively exhibit a glossy feeling or the like, originally possessed by a metal material forming the metal powder, in an obtained recorded matter. Moreover, it is possible to make a pattern (printed portion) to be formed have superior glossy feeling and high-grade feeling and to make the recorded matter have superior abrasion resistance. In addition, in a configuration in which the above-described surface treatment using a fluorine-based compound (particularly a fluorine-based phosphate compound) is not performed, a tendency that the storage stability and the discharge stability of the ink jet composition deteriorate becomes particularly conspicuous when the metal powder has a scale shape. However, in the invention, it is possible to reliably prevent the occurrence of such a problem even when the metal powder has a scale shape. That is, when the shape of metal powder is in a scale shape, the effect of the invention is more remarkably exhibited.

In the invention, the scale shape refers to a shape such as a flat plate shape and a curved plate shape. In particular, the ratio $(S_1/S_0)$ of an average particle diameter $(S_1)$ to an average thickness $(S_0)$ of metal powder is preferably greater than or equal to 2, more preferably greater than or equal to 5, and particularly preferably greater than or equal to 8.

The average particle diameter of the metal powder is preferably 300 nm to 1,000 nm, more preferably 350 nm to 1,000 nm, and still more preferably 400 nm to 800 nm.

Accordingly, it is possible to make the recorded matter produced using the ink jet composition have superior glossy feeling and high-grade feeling. In addition, it is possible to make the ink jet composition have superior storage stability and discharge stability.

In the present specification, the "average particle diameter" refers to the size of the main surface of the metal powder, and refers to a volume-based average particle diameter (volume average particle diameter (D50)). An example of a measurement device includes a laser diffraction-scattering type particle size analyzer MICROTRAC MT-3000 (manufactured by Nikkiso Co., Ltd.). Measurement of D50 using the device is performed by putting a dispersion solution containing metal powder to be measured into a circulating solvent of diethylene glycol diethyl ether at room temperature of about 25° C. to dilute the metal powder to a measurable concentration, and it is possible to calculate volume-based D50 by regularly differentiating the distribution of particle diameters acquired as reflective particles on a logarithmic axis.

In addition, the average thickness of the metal powder is preferably 10 nm to 40 nm. The average thickness can be measured through the following method using an atomic force microscope. Few droplets of an aluminum pigment diluted 10 times or more with acetone are added dropwise onto a smooth glass substrate and are allowed to dry naturally for 2 hours or longer.

Next, 30 points of the aluminum pigment forcibly aligned on the glass substrate were extracted using an atomic force microscope (manufactured by Seiko Instruments Inc.: "SPA400") and of which the thicknesses are measured through a tapping mode. Among the thicknesses of the 30 points measured, the thicknesses of the highest and lowest 3 points are excluded and an average value of the thicknesses of the remaining 24 points is obtained, which is regarded as an average thickness.

The content rate of the metal powder in the ink jet composition is preferably 0.5 mass % to 10.0 mass %, more preferably 0.7 mass % to 5.0 mass %, and still more preferably 1.0 mass % to 2.0 mass %.

Organic Solvent

An organic solvent functions as a dispersion medium for dispersing metal powder in the ink jet composition. The organic solvent is removed (evaporated) in a process of producing a recorded matter.

The boiling point of the organic solvent under 1 atm is preferably 100° C. to 300° C. and more preferably 150° C. to 250° C.

Accordingly, it is possible to make the composition during storage of the ink jet composition have superior stability and discharge stability while making the recorded matter in which the ink jet composition is used have sufficiently excellent productivity.

Any organic solvent may be used as long as it is an organic compound in a liquid state in a usage environment (for example, at a normal temperature (20° C.) and a normal pressure (1 atm)) of the ink jet composition. It is possible to use, for example, alcohol compounds (monohydric alcohols such as methyl alcohol, ethyl alcohol, propyl alcohol, butyl alcohol, and isopropyl alcohol, alkylene glycols such as ethylene glycol, propylene glycol, or polyhydric alcohols such as glycerin, and fluorides thereof) ketone compounds (acetone, methyl ethyl ketone, cyclohexanone, and the like), carboxylic acid ester compounds (methyl acetate, ethyl acetate, propyl acetate, butyl acetate, methyl propionate, ethyl propionate, and the like), ether compounds (diethyl ether, dipropyl ether, tetrahydrofuran, dioxane, and the like), and lactone compounds as a dispersion medium of the dispersion.

In addition, it is possible to use alkylene glycol derivatives such as compounds (alkylene glycol monoether and alkylene glycol diether) in which at least one hydroxyl group contained in the above-described alkylene glycol is etherified and compounds (alkylene glycol monoester and alkylene glycol diester) in which at least one hydroxyl group contained in the above-described alkylene glycol is esterified. Hereinafter, alkylene glycol and alkylene glycol derivatives are collectively referred to as "alkylene glycol compounds".

In particular, the ink jet composition preferably contains at least one compound selected from an alkylene glycol compound and a lactone compound, as the organic solvent.

Accordingly, it is possible to make the ink jet composition have superior storage stability and discharge stability. In addition, it is possible to rapidly remove a solvent from the ink jet composition after discharging through an ink jet method, and therefore, it is possible to make a recorded matter have superior productivity.

In addition, examples of alkylene glycol moieties of the alkylene glycol compounds include ethylene glycol, diethylene glycol, triethylene glycol, tetraethylene glycol, propylene glycol, dipropylene glycol, tripropylene glycol, and tetrapropylene glycol.

Specific examples of alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, dipropylene glycol monomethyl ether, and dipropylene glycol monoethyl ether.

Specific examples of alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

Examples of lactone compounds that can be used as organic solvents include γ-butyrolactone, δ-valerolactone, and ε-caprolactone.

Among these, an organic solvent containing one kind or two or more kinds selected from the group consisting of diethylene glycol dimethyl ether, diethylene glycol diethyl ether, tetraethylene glycol dimethyl ether, tetraethylene glycol dibutyl ether, tetraethylene glycol monobutyl ether, and γ-butyrolactone is preferable.

Accordingly, it is possible to make the ink jet composition have superior storage stability and discharge stability.

In addition, it is possible to make the recorded matter have superior glossy feeling and high-grade feeling.

In particular, when the ink jet composition contains γ-butyrolactone, it is possible to obtain superior adhesiveness between a recording medium, to which the ink jet composition is applied in the recorded matter produced using the ink jet composition, and a recorded portion formed using the ink jet composition. In addition, it is possible to make the printed portion of the recorded matter produced using the ink jet composition have superior a glossy feeling.

The content rate of the organic solvent in the ink jet composition is preferably 70.0 mass % to 99.5 mass % and more preferably 80.0 mass % to 98.5 mass %.

Accordingly, it is possible to make the ink jet composition have superior storage stability and discharge stability and to make the recorded matter produced using the ink jet composition have a superior glossy feeling or the like. The ink jet composition may contain two or more compounds as organic solvents. In this case, the sum of the content rate of these compounds is preferably a value within the range.

When the ink jet composition contains γ-butyrolactone, the content rate of γ-butyrolactone in the ink jet composition is preferably 3.0 mass % to 25.0 mass % and more preferably 5.0 mass % to 20.0 mass %.

Accordingly, it is possible to obtain superior adhesiveness between a recording medium, to which the ink jet composition is applied in the recorded matter produced using the ink jet composition, and a recorded portion formed using the ink jet composition. In addition, it is possible to make the printed portion of the recorded matter produced using the ink jet composition have superior a glossy feeling. In addition, when another ink (for example, an ink containing at least one of a pigment and a dye as a colorant) is applied onto the recorded portion formed using the ink jet composition in a superimposed manner, it is possible to suitably prevent the other ink from being unwillingly repelled and to form an intended pattern with high accuracy.

Binder Resin (Binder)

A binder resin has a function of improving adhesiveness of metal powder to a recording medium in a recorded matter produced using an ink jet composition.

When the binder resin is contained in the ink jet composition, it is possible to improve durability (particularly, adhesiveness of the recorded portion to the recording medium, durability, and the like) of the recorded matter.

In particular, in the invention, the ink jet composition contains a resin having a styrene-maleic acid structure as a binder resin.

Accordingly, it is possible to make the printed portion have excellent glossy feeling or adhesiveness to the recording medium in the recorded matter produced using the ink jet composition while making the ink jet composition have superior storage stability and discharge stability. Such an excellent effect is obtained when the metal powder is surface-treated with a fluorine-based compound. When the metal powder is not surface-treated with a fluorine-based compound, the above-described excellent effect is not obtained even when a resin having a styrene-maleic acid structure is contained in the ink jet composition.

In the invention, the resin having a styrene-maleic acid structure (hereinafter, also referred to as a "styrene-maleic resin") refers to a polymer containing at least one selected from the group (hereinafter, also referred to as a "styrene-based monomer") consisting of styrene and a derivative thereof and at least one selected from the group (hereinafter, also referred to as a "maleic acid-based monomer") consisting of maleic acid and a derivative thereof, in its molecule.

Examples of the derivative of styrene include a derivative in which at least one of hydrogen atoms contained in styrene is substituted with another substituent (an atom or an atomic group) such as a halogen atom or a hydrocarbon group.

Examples of the derivative of maleic acid include a derivative in which a hydrogen atom (at least one of two hydrogen atoms at the α-position) contained in maleic acid is substituted with another substituent (an atom or an atomic group) such as a halogen atom or a hydrocarbon group, a compound in which at least one of two carboxyl groups contained in the derivative or maleic acid is esterified, a compound in which at least one of the two carboxyl groups is amidated, a compound (including a cyclic imide structure (such as a maleimide structure) in which two carboxyl groups participate) in which at least one of the two carboxyl groups is imidized, and a compound (including a cyclic acid anhydride structure (such as a maleic acid anhydride structure) in which two carboxyl groups participate) in which at least one of the two carboxyl groups is converted into an acid anhydride.

In particular, it is preferable that the styrene-maleic resin contain at least one compound contained in the group consisting of a compound represented by Formula (2) and a compound represented by Formula (3).

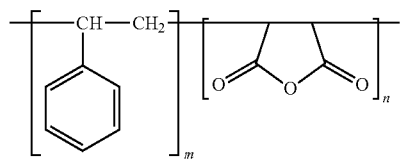

(2)

(In Formula (2), n and m each independently represent an integer of 1 or more.)

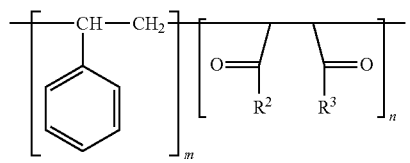

(3)

(In Formula (3), one of $R^2$ or $R^3$ is —OH and the other is —$NR^4R^5$ (where $R^4$ and $R^5$ each independently represent a hydrogen atom or a hydrocarbon group having 6 or less carbon atoms), n and m each independently represent an integer of 1 or more.)

Accordingly, it is possible to make the ink jet composition have superior storage stability and discharge stability. In addition, in the recorded matter produced using the ink jet composition, it is possible to make the printed portion have superior glossy feeling and adhesiveness to a recording medium.

The ink jet composition may contain a styrene-maleic resin in addition to the compounds represented by Formulae (2) and (3). The sum of the content rate of the compound represented by Formula (2) and the content rate of the compound represented by Formula (3) which occupies the whole styrene-maleic resin contained in the ink jet composition is preferably greater than or equal to 80 mass %, more preferably greater than or equal to 90 mass %, and still more preferably greater than or equal to 95 mass %.

Accordingly, the above-described effect is more remarkably exhibited.

Both of the compounds represented by Formulae (2) and (3) may include one or plural kinds of styrene-based monomers or may include one or plural kinds of maleic acid-based monomers.

In addition, the styrene-maleic resin may be a polymer containing a styrene-based monomer and a maleic acid-based monomer as monomer components, and may contain constituent monomers (other monomers) other than the styrene-based monomer and the maleic acid-based monomer.

However, the content rate of other monomers in all monomers constituting the styrene-maleic resin is preferably less than or equal to 10 mol %, more preferably less than or equal to 5 mol %, and still more preferably less than or equal to 3 mol %.

In addition, the arrangement of the constituent monomers in the styrene-maleic resin is not particularly limited.

That is, the styrene-maleic resin (containing the compounds represented by Formulae (2) and (3)) may be either a random copolymer, an alternating copolymer, a block copolymer, or a graft copolymer.

An MS/MM value (n/m value in Formulae (2) and (3)) when the number of moles of the styrene-based monomer contained in the styrene-maleic resin is set as MS [mol] and the number of moles of the maleic acid-based monomer is set as MM [mol] preferably satisfies a relation of $0.5 \leq MS/MM \leq 15$, more preferably satisfies a relation of $0.8 \leq MS/MM \leq 10$, and still more preferably satisfies a relation of $1.0 \leq MS/MM \leq 8.0$.

Accordingly, it is possible to make the ink jet composition have superior storage stability and discharge stability. In addition, in the recorded matter produced using the ink jet composition, it is possible to make the printed portion have superior glossy feeling and adhesiveness to a recording medium.

The acid value of the styrene-maleic resin is preferably 120 mgKOH/g to 250 mgKOH/g, more preferably 140 mgKOH/g to 230 mgKOH/g, and still more preferably 155 mgKOH/g to 215 mgKOH/g.

Accordingly, it is possible to make the ink jet composition have superior storage stability and discharge stability. In addition, in the recorded matter produced using the ink jet composition, it is possible to make the printed portion have superior glossy feeling and adhesiveness to a recording medium.

The weight-average molecular weight MW of the styrene-maleic resin is preferably 3,000 to 30,000, more preferably 5,000 to 20,000, and still more preferably 7,000 to 15,000.

Accordingly, it is possible to make the ink jet composition have superior storage stability and discharge stability. In addition, in the recorded matter produced using the ink jet composition, it is possible to make the printed portion have superior glossy feeling and adhesiveness to a recording medium.

The content rate of the styrene-maleic resin in the ink jet composition is preferably 0.1 mass % to 4.5 mass % and more preferably 0.2 mass % to 2.0 mass %.

Accordingly, it is possible to make the ink jet composition have superior storage stability and discharge stability. In addition, in the recorded matter produced using the ink jet composition, it is possible to make the printed portion have superior glossy feeling and adhesiveness to a recording medium.

When the content rate of the styrene-maleic resin in the ink jet composition is set as $X_{SM}$ [mass %] and the content rate of metal powder is set as $X_M$ [mass %], a relation of $0.05 \leq X_{SM}/X_M \leq 4.0$ is preferable, a relation of $0.10 \leq X_{SM}/X_M \leq 0.70$ is more preferable, and a relation of $0.15 \leq X_{SM}/X_M \leq 0.55$ is still more preferable.

Accordingly, it is possible to make the ink jet composition have superior storage stability and discharge stability. In addition, in the recorded matter produced using the ink jet composition, it is possible to make the printed portion have superior glossy feeling and adhesiveness to a recording medium.

The ink jet composition may contain binder resins (other binder resins) other than the above-described styrene-maleic resin.

Examples of such binder resins (other binder resins) include an acrylic resin, a styrene-acrylic resin, a rosin-modified resin, a terpene-based resin, a polyester resin, a polyamide resin, an epoxy resin, a vinyl chloride resin, a vinyl chloride-vinyl acetate copolymer, cellulose-based resins (for example, cellulose acetate butyrate and hydroxypropyl cellulose), polyvinyl butyral, polyvinyl alcohol, and polyurethane.

When a styrene-acrylic resin (a copolymer containing a styrene-based monomer and a (meth)acrylic acid-based monomer (including an ester, an amide, an imide, and the like) is further contained as the binder resins (other binder resins) in addition to the above-described resin having a styrene-maleic acid structure, it is possible to make the ink jet composition have superior storage stability and discharge stability. In addition, in the recorded matter produced using the ink jet composition, it is possible to make the printed portion have superior glossy feeling and adhesiveness to a recording medium.

The binder resins may be dispersed or dissolved in an organic solvent in the ink jet composition.

The content rate (the total content rate of the resin having the styrene-maleic acid structure and other binder resins) of the binder resins in the ink jet composition is preferably 0.2 mass % to 10.0 mass % and more preferably 0.3 mass % to 5.0 mass %.

Accordingly, it is possible to make the ink jet composition have superior storage stability and discharge stability. In addition, in the recorded matter produced using the ink jet composition, it is possible to make the printed portion have superior glossy feeling and adhesiveness to a recording medium.

Surfactant

The ink jet composition may further contain a surfactant.

In particular, the ink jet composition preferably contains at least one selected from a silicone-based surfactant, a polyoxyethylene-based surfactant, a phosphoric acid-based surfactant, and acetylene diol, and more preferably contains a phosphoric acid-based surfactant.

Accordingly, aggregation of the metal powder can be more suitably prevented, and flowability of the ink jet composition is improved. As a result, it is possible to make the ink jet composition have superior storage stability and discharge stability. In addition, it is possible to more suitably arrange the metal powder on a recording medium and to make a recorded matter have superior glossy feeling and abrasion resistance.

Examples of the silicone-based surfactant include polyether-modified silicone (for example, BYK-300, 306, 307; BYK Japan KK, and KF-6011, 6012, 6017, 6015, 6043; Shin-Etsu Chemical Co., Ltd.), polyester-modified silicone (for example, BYK-313, 315; BYK Japan KK), acryl-terminated polyether-modified silicone (for example, BYK-3500, 3510, 3530; BYK Japan KK) acryl-terminated polyester-modified silicone (for example, BYK-3570; BYK Japan KK), polyglycerol-modified silicone (for example, KF-6100, 6104; Shin-Etsu Chemical Co., Ltd.), aminopropyl-modified silicone (for example, KF-8015, 8020; Shin-Etsu Chemical Co., Ltd.), and amino-modified silicone (for example, KF-8004, 867S; Shin-Etsu Chemical Co., Ltd.).

Examples of the polyoxyethylene-based surfactant include polyoxyethylene alkyl ethers such as polyoxyethylene cetyl ether (for example, NISSAN NONION P-208; NOF CORPORATION), polyoxyethylene oleyl ether (for example, NISSAN NONION E-202S, E-205S; NOF CORPORATION), and polyoxyethylene lauryl ether (for example, EMULGEN 106, 108; Kao Corporation), polyoxyethylene alkylphenol ethers such as polyoxyethylene octylphenol ether (for example, NISSAN NONION HS-204, HS-206, HS-208; NOF CORPORATION), sorbitan monoesters such as sorbitan monocaprylate (for example, NISSAN NONION CP-08R; NOF CORPORATION) and sorbitan monolaurate (for example, NISSAN NONION LP-20R; NOF CORPORATION), and polyoxyethylene sorbitan monoesters such as polyoxyethylene sorbitan monostearate (for example, NISSAN NONION OT-221; NOF CORPORATION), polycarboxylic acid-based polymer activator (For example, FLOWLEN G-700; KYOEISHA CHEMICAL Co., LTD.), polyoxyethylene higher alcohol ether (for example, EMULGEN 707, 709; Kao Corporation), tetraglycerin oleate (for example, POEM J-4581; RIKEN VITAMIN CO., LTD.), nonylphenol ethoxylate (for example, ADEKA TOL NP-620, NP-650, NP-660, NP-675, NP-683, NP-686; ADEKA CORPORATION) aliphatic phosphoric acid ester (for example, ADEKA COL CS-141E, TS-230E; ADEKA CORPORATION), sorbitan sesquioleate (for example, SORGEN 30; DKS Co. Ltd.), sorbitan monooleate (for example, SORGEN 40; DKS Co. Ltd.), polyethylene glycol sorbitan monolaurate (for example, SORGEN TW-20; DKS Co. Ltd.), and polyethylene glycol sorbitan monooleate (for example, SORGEN TW-80; DKS Co. Ltd.).

It is possible to use, for example, DISPERBYK-102, DISPERBYK-103, DISPERBYK-106, DISPERBYK-110, DISPERBYK-118, and DISPERBYK-180 (manufactured by BYK Japan KK); and PLYSURF A212C, PLYSURF A215C, PLYSURF A208F, PLYSURF M208F, PLYSURF A208N, and PLYSURF A210D (manufactured by DKS Co. Ltd.) as the phosphoric acid-based surfactant.

It is possible to use, for example, SURFYNOL 104, 82, 465, 485, or TG (all are available from Air Products and Chemicals, Inc.), OLFINE STG and OLFINE E1010 (all are trade names manufactured by Nissin Chemical Co., Ltd.) as acetylene diol.

When the ink jet composition contains a surfactant, the content rate of the above-described surfactant in the ink jet composition is preferably 0.01 mass % to 5.0 mass % and more preferably 0.1 mass % to 2.0 mass %.

Accordingly, it is possible to make the ink jet composition have superior storage stability and discharge stability and to make the recorded matter produced using the ink jet composition have a superior glossy feeling or the like. The ink jet composition may contain two or more compounds as the above-described surfactant. In this case, the sum of the content rate of these compounds is preferably a value within the range.

In addition, when the ink jet composition contains a phosphoric acid-based surfactant, when the content rate of the phosphoric acid-based surfactant in the ink jet composition is set as $X_P$ [mass %] and the content rate of metal powder is set as $X_M$ [mass %], a relation of $0.05 \leq X_P/X_M \leq 0.80$ is preferable, a relation of $0.10 \leq X_P/X_M \leq 0.70$ is more preferable, and a relation of $0.15 \leq X_P/X_M \leq 0.55$ is still more preferable.

Accordingly, it is possible to make the ink jet composition have a superior discharge stability.

Other Components

The ink jet composition of the invention may contain components (other components) other than those described above. Examples of such components include a slipping agent (leveling agent), a dispersant, a penetration enhancer, a moistening agent (moisturizer), a pH adjuster, colorants (pigments, dyes), a matting agent, waxes, an antibacterial agent, a preservative, an antioxidant, a chelating agent, a thickener, and a sensitizer (sensitizing dye).

When the ink jet composition contains a slipping agent, the surface of the recorded matter becomes smooth through a leveling action, and the abrasion resistance is improved.

The slipping agent is not particularly limited, but it is possible to use, for example, a silicone-based surfactant such as polyester-modified silicone or polyether-modified silicone, and it is preferable to use polyether-modified polydimethylsiloxane or polyester-modified polydimethylsiloxane.

The viscosity of the ink jet composition of the invention at room temperature (20° C.) is preferably less than or equal to 20 mPa·s and more preferably 2 mPa·s to 15 mPa·s.

Accordingly, it is possible to suitably discharge liquid droplets through the ink jet method.

The viscosity can be obtained by measurement using a vibration-type viscometer in compliance with JIS Z8809.

Recorded Matter

Next, the recorded matter of the invention will be described.

The recorded matter of the invention includes a recording medium and a recorded portion formed using the ink jet composition according to the invention as described above. In other words, the recorded matter of the invention includes a recording medium and a recorded portion made of a material containing metal powder surface-treated with a fluorine-based compound and a styrene-maleic resin.

Such a recorded matter has a pattern (printed portion) having excellent glossy feeling and durability.

Any recording medium may be used and it is possible to suitably use, for example, paper (plain paper, exclusive paper for ink jet, art coated paper, and the like), and a recording medium made of a plastic material such as vinyl chloride or propylene carbonate.

The recorded matter of the invention may be used for any purpose, for example, it may be applied to ornaments or other products. Specific examples of the recorded matter of the invention include vehicle interior articles such as a console lid, a switch base, a center cluster, an interior panel, an emblem, a center console, and a meter nameplate, operation portions (key switches) of various electronic devices, an indoor advertisement, a confectionery gift box, a cosmetic box, an outdoor advertisement such as a tarpaulin, a decorative portion exhibiting decorativeness, and display objects such as an indicator or a logo.

It is possible to use a piezo system, a system of discharging ink by bubbles generated by heating the ink, or the like as a liquid droplet discharge system (system of the ink jet method), but a piezo system is preferable from the viewpoint that the ink jet composition hardly deteriorates.

The discharge of the ink jet composition through the ink jet method can be performed using a well-known liquid droplet discharge device.

The ink jet composition discharged toward a recording medium through the ink jet method loses fluidity of a formed printed portion and has a stabilized shape through removal of an organic solvent.

When removing an organic solvent, decompression treatment or heat treatment may be performed.

Accordingly, it is possible to increase the efficiency of removing the organic solvent and to make a recorded matter have superior productivity. In addition, it is possible to further improve durability of the recorded matter.

Although the invention has been described based on preferred embodiments, the invention is not limited thereto.

EXAMPLES

Next, specific examples of the invention will be described.

[1] Production of Ink Jet Composition

Example 1

First, Metasheen 41-0010 (manufactured by BASF SE) was prepared as a paste-like composition containing aluminum powder as scale-like metal powder.

After diluting this composition with diethylene glycol diethyl ether (DEDG), ultrasonic vibration of 40 kHz or less was applied to pulverize the aluminum powder.

Next, the dispersion liquid containing the pulverized aluminum powder was heated to 50° C., $CF_3(CF_2)_5(CH_2)_2P(O)(OH)_2$ as a fluorine-based compound was added to the dispersion liquid, and the mixture was stirred for 3 hours to perform surface treatment on the aluminum powder using a fluorine-based phosphate compound. At this time, the addition amount of the fluorine-based phosphate compound with respect to 100 parts by mass of the aluminum powder was set to 5.0 parts by mass.

Next, the dispersion liquid was cooled to room temperature (20° C.). Then, DISPERBYK-102 (manufactured by BYK Japan KK) as a phosphoric acid-based surfactant and BYK-3500 (manufactured by BYK Japan KK) as a silicone-based surfactant were added thereto, and the mixture was stirred at 150 rpm for 1 hour. At this time, the addition amount of the phosphoric acid-based surfactant with respect to 100 parts by mass of the aluminum powder was set to 20.0 parts by mass.

Thereafter, coarse aluminum powder was filtered out from the dispersion liquid using a filter having a pore diameter of 3 μm.

The aluminum powder filtered out was mixed with a mixed solvent of diethylene glycol diethyl ether (DEDG), γ-butyrolactone (γ-BL), and tetraethylene glycol monobutyl ether (BTGH). A 10 mass % diethylene glycol diethyl ether (DEDG) solution SMA-EF40 (manufactured by KAWAHARA PETROCHEMICAL CO., LTD., acid value of 195 to 235, MW 11,000) (where an n/m value in Formula (2) is 4.0) as a resin having a styrene-maleic acid structure was added thereto and the mixture was stirred at 150 rpm for 1 hour to obtain an ink jet composition having a composition shown in Table 1.

Examples 2 to 18

Ink jet compositions were produced in the same manner as in Example 1 except that the configuration (the composition of base particles and the kind of compound (fluorine-based compound) used for surface treatment) of metal particles was set as shown in Tables 1 and 2 and the ink jet compositions have compositions shown in Tables 1 and 2 by changing the kinds and proportions of raw materials used for preparing the ink jet compositions.

Comparative Example 1

An ink jet composition was prepared in the same manner as in Example 1 except that particles made of Al which had not been subjected to surface treatment were used as metal powder.

Comparative Example 2

An ink jet composition was produced in the same manner as in Example 1 except that metal powder was obtained by performing surface treatment using $CH_3(CH_2)_7P(O)(OH)_2$, which is not a fluorine-based compound, instead of the fluorine-based compound.

Comparative Example 3

An ink jet composition was prepared in the same manner as in Example 1 except that no binder resin was used.

Comparative Example 4

An ink jet composition was prepared in the same manner as in Example 1 except that cellulose acetate butyrate was used as the binder resin instead of the styrene-maleic resin.

For each example and comparative example, the composition and the like of the ink jet composition are collectively shown in Tables 1 and 2. In the tables, $CF_3(CF_2)_5(CH_2)_2P(O)(OH)_2$ is represented by "S1", $CF_3(CF_2)_3(CH_2)_2P(O)(OH)_2$ is represented by "S2", $CF_3(CF_2)_5(CH_2)_2P(O)(OH)(OCH_2CH_3)$ is represented by "S3", $CF_3(CF_2)_3(CH_2)_2P(O)(OH)(OCH_2CH_3)$ is represented by "S4", $CF_3(CF_2)_5(CH_2)_2O\text{—}P(O)(OH)(OC_2H_5)$ is represented by "S5", $CF_3\text{—}CH_2CH_2\text{—}Si(OCH_3)_3$ is represented by "S6", $CH_3(CH_2)_7P(O)(OH)_2$ is represented by "S'1", diethylene glycol diethyl ether is represented by "DEDG", γ-butyrolactone is represented by "γ-BL", tetraethylene glycol monobutyl ether is represented by "BTGH", tripropylene glycol monomethyl ether is represented by "MFTG", SMA-EF40 (manufactured by KAWAHARA PETROCHEMICAL CO., LTD., acid value of 195 to 235, MW 11,000) (where an n/m value in Formula (2) is 4.0) as a styrene-maleic resin is represented by "SM1", SMA-1440F (KAWAHARA PETROCHEMICAL CO., LTD., acid value of 165 to 205, MW 7,000) as a styrene-maleic resin is represented by "SM2", X220 (manufactured by SEIKO PMC CORPORATION, acid value of 155, MW 13,000) (where one of $R^2$ or $R^3$ in Formula (3) is —OH and the other is an esterified copolymer) as a styrene-maleic resin is represented by "SM3", X200 (manufactured by SEIKO PMC CORPORATION, acid value of 190, MW 12,000) (where one of $R^2$ or $R^3$ in Formula (3) is —OH and the other is an esterified copolymer) as a styrene-maleic resin is represented by "SM4", and cellulose acetate butyrate is represented by "CAB". In addition, regarding Example 13 in the tables, the content rate of each element is expressed in a weight ratio with respect to the composition of the constituent material of base particles. In addition, the average particle diameter ($S_1$), the average thickness (S0), and the ratio ($S_1$/S0) thereof of each metal powder particle were measured by the above-described method and are collectively shown in Tables 1 and 2. In addition, the viscosities of the ink jet compositions of the examples measured using a vibration type viscometer in accordance with JIS Z8809 at 20° C. are all within a range of 3 mPa·s to 15 mPa·s.

TABLE 1

| | Configuration of metal powder | | | | | |
|---|---|---|---|---|---|---|
| | Base particles Constituent material | Surface treatment agent | | | Average particle diameter [nm] | Thickness [nm] |
| | | Type | Used amount [parts by mass] with respect to 100 parts by mass of base particles | S1/S0 | | |
| Example 1 | Al | S1 | 5.0 | 22.5 | 450 | 20.0 |
| Example 2 | Al | S2/S4 | 4.5/0.5 | 24.1 | 470 | 19.5 |
| Example 3 | Al | S3/S5 | 4.5/0.5 | 24 | 483 | 20.1 |
| Example 4 | Al | S6 | 5.0 | 23.5 | 465 | 19.8 |
| Example 5 | Al | S1 | 5.0 | 24.3 | 491 | 20.2 |
| Example 6 | Al | S1 | 5.0 | 23.3 | 464 | 19.9 |
| Example 7 | Al | S1 | 5.0 | 22.6 | 445 | 19.7 |
| Example 8 | Al | S1 | 5.0 | 22.6 | 445 | 19.7 |
| Example 9 | Al | S1 | 5.0 | 14.9 | 298 | 20.0 |
| Example 10 | Al | S1 | 5.0 | 50.9 | 1013 | 19.9 |
| Example 11 | Al | S1 | 5.0 | 56.2 | 1108 | 19.7 |

| | Configuration of ink jet composition | | | |
|---|---|---|---|---|
| | Metal powder Content rate [parts by weight] | Organic solvent Content rate [parts by weight] | Binder resin Content rate [parts by weight] | Xsa/Xm |
| Example 1 | 1.5 | DEDG/γ-BL/BTGH 72.4/15/10 | SM1 0.4 | 0.33 |
| Example 2 | 1.5 | DEDG/γ-BL/BTGH 72.4/15/10 | SM1 0.4 | 0.33 |

TABLE 1-continued

| | | | | | | |
|---|---|---|---|---|---|---|
| Example 3 | 1.5 | DEDG/γ-BL/BTGH | 72.4/15/10 | SM1 | 0.4 | 0.33 |
| Example 4 | 1.5 | MEDG/γ-BL/MFTG | 72.4/15/10 | SM1 | 0.4 | 0.33 |
| Example 5 | 1.5 | DEDG/γ-BL/BTGH | 72.4/15/10 | SM2 | 0.4 | 0.33 |
| Example 6 | 1.5 | DEDG/γ-BL/BTGH | 72.4/15/10 | SM3 | 0.4 | 0.33 |
| Example 7 | 1.5 | DEDG/γ-BL/BTGH | 72.4/15/10 | SM1/SM2 | 0.2/0.2 | 0.33 |
| Example 8 | 1.5 | DEDG/γ-BL/BTGH | 72.4/15/10 | SM1/SM4 | 0.2/0.2 | 0.33 |
| Example 9 | 1.5 | DEDG/γ-BL/BTGH | 72.4/15/10 | SM1 | 0.4 | 0.33 |
| Example 10 | 1.5 | DEDG/γ-BL/BTGH | 72.4/15/10 | SM1 | 0.4 | 0.33 |
| Example 11 | 1.5 | DEDG/γ-BL/BTGH | 72.4/15/10 | SM1 | 0.4 | 0.33 |

TABLE 2

| | Configuration of metal powder | | | | | |
|---|---|---|---|---|---|---|
| | Base particles Constituent material | Surface treatment agent | | | Average particle diameter [nm] | Thickness [nm] |
| | | Type | Used amount [parts by mass] with respect to 100 parts by mass of base particles | S1/S0 | | |
| Example 12 | Al | S1 | 5.0 | Spherical | 488 | — |
| Example 13 | Cu90Zn10 | S1 | 5.0 | 23.8 | 479 | 20.1 |
| Example 14 | Al | S1 | 5.0 | 23.4 | 468 | 20.0 |
| Example 15 | Al | S1 | 5.0 | 24.8 | 491 | 19.8 |
| Example 16 | Al | S1 | 5.0 | 23.8 | 483 | 20.3 |
| Example 17 | Al | S1 | 5.0 | 24 | 477 | 19.9 |
| Example 18 | Al | S1 | 5.0 | 25 | 503 | 20.1 |
| Comparative Example 1 | Al | — | — | 25 | 492 | 19.7 |
| Comparative Example 2 | Al | S'1 | 5.0 | 25 | 492 | 19.7 |
| Comparative Example 3 | Al | S1 | 5.0 | 24.1 | 489 | 20.3 |
| Comparative Example 4 | Al | S1 | 5.0 | 24.1 | 489 | 20.3 |

| | Configuration of ink jet composition | | | | |
|---|---|---|---|---|---|
| | Metal powder Content rate [parts by weight] | Organic solvent | | Binder resin | Xsm/Xm |
| | | | Content rate [parts by weight] | Content rate [parts by weight] | |
| Example 12 | 1.5 | DEDG/γ-BL/BTGH | 72.4/15/10 | SM1 0.4 | 0.33 |
| Example 13 | 1.5 | DEDG/γ-BL/BTGH | 72.4/15/10 | SM1 0.4 | 0.33 |
| Example 14 | 1.5 | DEDG/γ-BL/BTGH | 72.4/15/10 | SM1 0.02 | 0.013 |
| Example 15 | 1.5 | DEDG/γ-BL/BTGH | 72.4/15/10 | SM1 0.03 | 0.020 |
| Example 16 | 1.5 | DEDG/γ-BL/BTGH | 72.4/15/10 | SM1 0.3 | 0.2 |
| Example 17 | 1.5 | DEDG/γ-BL/BTGH | 72.4/15/10 | SM1 5.0 | 3.3 |
| Example 18 | 1.5 | DEDG/γ-BL/BTGH | 72.4/15/10 | SM1 6.0 | 4.0 |
| Comparative Example 1 | 1.5 | DEDG/γ-BL/BTGH | 72.4/15/10 | SM1 0.5 | 0.33 |
| Comparative Example 2 | 1.5 | DEDG/γ-BL/BTGH | 72.4/15/10 | SM1 0.5 | 0.33 |

TABLE 2-continued

| | | | | | | |
|---|---|---|---|---|---|---|
| Comparative Example 3 | 1.5 | DEDG/γ-BL/ BTGH | 72.4/15/10 | — | — | 0 |
| Comparative Example 4 | 1.5 | DEDG/γ-BL/ BTGH | 72.4/15/10 | CAB | 0.5 | 0.33 |

[2] Evaluation of Ink Jet Composition
[2-1] Evaluation of Stability of Discharging Liquid Droplets (Evaluation of Discharge Stability)

Evaluation was performed through tests shown below using the ink jet compositions of the examples and comparative examples immediately after production.

First, a commercially available recording device SC-S80650 (manufactured by Seiko Epson Corp.) installed in a chamber (thermal chamber) and the ink jet compositions of the examples and comparative examples were prepared. Solid printing was performed on a graphic film (manufactured by 3M, IJ40-10R) as a recording medium in an environment of 25° C. and 55% RH with a resolution of 720×1440 dpi and a drying temperature of 45° C., and evaluation was performed for the ink jet compositions according to the following criteria.

Nozzle abnormality (number of times of falling out or bending) in a direction perpendicular to a media feeding direction which appears in 1 inch in all directions in a printed region 5 minutes after the start of printing.
A: The incidence of falling out of a nozzle is less than 2%.
B: The incidence of falling out of a nozzle is greater than or equal to 2% and less than 5%.
C: The incidence of falling out of a nozzle is greater than or equal to 5% and less than 10%.
D: The incidence of falling out of a nozzle is greater than or equal to 10% and less than 20%.

[3] Production of Recorded Matter

Recorded matters were produced as follows using the ink jet compositions of the examples and the comparative examples.

First, a commercially available recording device SC-S80650 (manufactured by Seiko Epson Corp.) installed in a chamber (thermal chamber) and the ink jet compositions of the examples and comparative examples were prepared. Solid printing was performed on graphic films (manufactured by 3M, IJ40-10R) as recording media with a resolution of 720×1440 dpi.

Thereafter, the printed matters were subjected to heat treatment (heating and drying) at 50° C. for 30 seconds, and was then allowed to stand at room temperature (20° C.) for 48 hours (natural drying) to obtain recorded matters.

10 recorded matters were produced through the above-described method using the ink jet compositions of the examples and comparative examples.

[4] Manufacture of Recorded Matter

The following evaluation was performed for the recorded matters obtained as described above.

[4-1] Glossiness at 600

For the printed surfaces of the recorded matters produced in the examples and comparative examples, the glossiness at a tilt angle of 600 was measured using a gloss meter (MINOLTA MULTI GLOSS 268), and evaluation was performed according to the following criteria.
A: The glossiness is greater than or equal to 350.
B: The glossiness is greater than or equal to 250 and less than 350.
C: The glossiness is greater than or equal to 200 and less than 250.
D: The glossiness is greater than or equal to 150 and less than 200.

[4-2] Abrasion Resistance

The printed surfaces of the recorded matters of the examples and comparative examples were rubbed 10 times using a GAKUSHIN-type color fastness rubbing tester AB-301 (manufactured by TESTER SANGYO CO., LTD.) and Mild Kun quite right (manufactured by KYOKUTO SANKI CO., LTD.) as an evaluation cloth under a load of 200 gf. The glossiness (at a tilt angle of 600) was measured through the same method described in [4-1] also for the recorded matters after the abrasion resistance test, the reduction rates of the glossiness before and after the abrasion resistance test were obtained, and evaluation was performed according to the following criteria.
A: The reduction rate of the glossiness is less than 8%.
B: The reduction rate of the glossiness is greater than or equal to 8% and less than 16%.
C: The reduction rate of the glossiness is greater than or equal to 16% and less than 26%.
D: The reduction rate of the glossiness is greater than or equal to 26% and less than 33%.

[4-3] Adhesiveness

SELLOTAPE (registered trademark) pieces No. 405 (manufactured by NICHIBAN CO., LTD.) were stuck on the printed surfaces of the recorded matters (which had not been subjected to the test of [4-2]) of the examples and comparative examples, and the surface of the tape pieces were rubbed 10 times using a GAKUSHIN-type color fastness rubbing tester AB-301 (manufactured by TESTER SANGYO CO., LTD.) under a load of 200 gf.

Thereafter, the tape pieces were peeled under the conditions of a peeling angle of 1800 and a peeling speed of 1 m/minute, the glossiness (at a tilt angle of 600) for the areas in which the tape pieces on the recorded matters were peeled was measured through the same method described in [4-1], the reduction rates of the glossiness before and after the test were obtained, and evaluation was performed according to the following criteria.
A: The reduction rate of the glossiness is less than 5%.
B: The reduction rate of the glossiness is greater than or equal to 5% and less than 10%.
C: The reduction rate of the glossiness is greater than or equal to 10% and less than 20%.
D: The reduction rate of the glossiness is greater than or equal to 20%.

These results are shown in Table 3.

TABLE 3

| | Discharge stability | Glossiness at 60° | Adhesiveness | Abrasion resistance |
|---|---|---|---|---|
| Example 1 | A | A | A | A |
| Example 2 | A | A | A | A |
| Example 3 | A | B | A | A |
| Example 4 | A | B | A | A |
| Example 5 | B | A | B | A |
| Example 6 | A | B | A | A |
| Example 7 | A | A | A | A |
| Example 8 | A | A | A | A |

TABLE 3-continued

|  | Discharge stability | Glossiness at 60° | Adhesiveness | Abrasion resistance |
|---|---|---|---|---|
| Example 9 | A | B | A | A |
| Example 10 | A | A | A | A |
| Example 11 | B | A | A | A |
| Example 12 | A | C | A | A |
| Example 13 | A | B | A | A |
| Example 14 | A | A | B | B |
| Example 15 | A | A | A | A |
| Example 16 | A | A | A | A |
| Example 17 | A | B | A | A |
| Example 18 | B | C | A | A |
| Comparative Example 1 | D | D | A | A |
| Comparative Example 2 | D | D | A | A |
| Comparative Example 3 | A | A | D | D |
| Comparative Example 4 | A | B | D | D |

The entire disclosure of Japanese Patent Application No. 2018-063936, filed Mar. 29, 2018 is expressly incorporated by reference herein.

What is claimed is:

1. An ink jet composition discharged by an ink jet method, comprising:
    metal powder;
    an organic solvent; and
    a resin having a styrene-maleic acid structure as a binder resin,
    wherein the ink jet composition contains metal powder surface-treated with a fluorine-based compound as the metal powder, and
    wherein the resin having the styrene-maleic acid structure contains at least one compound included in the group consisting of a compound represented by Formula (2) and a compound represented by Formula (3):

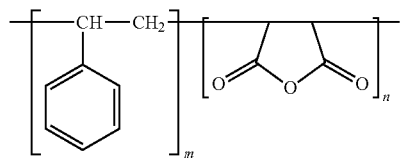

(2)

wherein in Formula (2), n and m each independently represent an integer of 1 or more;

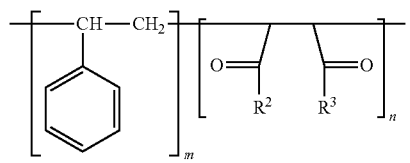

(3)

wherein in Formula (3), one of $R^2$ and $R^3$ is —OH and the other is —$NR^4R^5$ (where $R^4$ and $R^5$ each independently represent a hydrogen atom or a hydrocarbon group having 6 or less carbon atoms), n and m each independently represent an integer of 1 or more.

2. The ink jet composition according to claim 1, wherein the metal powder is obtained by surface-treating powder, of which at least a surface is mainly formed of Al, with the fluorine-based compound.

3. The ink jet composition according to claim 1, wherein the metal powder has a scale shape.

4. The ink jet composition according to claim 1, wherein the fluorine-based compound is a fluorine-based phosphate compound.

5. The ink jet composition according to claim 4, wherein the fluorine-based phosphate compound has a chemical structure represented by Formula (1)

$$POR_n(OH)_{3-n} \qquad (1)$$

(in Formula (1), R represents $CF_3(CF_2)_m$—, $CF_3(CF_2)_m(CH_2)_l$—, $CF_3(CF_2)_m(CH_2O)_l$—, $CF_3(CF_2)_m(CH_2CH_2O)_l$—, $CF_3(CF_2)_mO$—, or $CF_3(CF_2)_m(CH_2)_lO$—, n represents an integer of 1 to 3, m represents an integer of 3 to 17, and l represents an integer of 1 to 12).

6. The ink jet composition according to claim 4, wherein the fluorine-based phosphate compound is at least one of $CF_3(CF_2)_5(CH_2)_2P(O)(OH)_2$ and $CF_3(CF_2)_3(CH_2)_2P(O)(OH)_2$.

7. The ink jet composition according to claim 1, wherein an average particle diameter of the metal powder is 300 nm to 1,000 nm.

8. The ink jet composition according to claim 1, wherein a relation of $0.05 \leq X_{SM}/X_M \leq 4.0$ is satisfied when a content rate of the resin having the styrene-maleic acid structure in the ink jet composition is set as $X_{SM}$ [mass %] and a content rate of the metal powder in the ink jet composition is set as $X_M$ [mass %].

9. The ink jet composition according to claim 1, further comprising: at least one compound selected from an alkylene glycol compound and a lactone compound, as the organic solvent.

10. A recorded matter comprising:
    a recording medium; and
    a recorded portion formed using the ink jet composition according to claim 1.

11. A recorded matter comprising:
    a recording medium; and
    a recorded portion formed using the ink jet composition according to claim 2.

12. A recorded matter comprising:
    a recording medium; and
    a recorded portion formed using the ink jet composition according to claim 3.

13. A recorded matter comprising:
    a recording medium; and
    a recorded portion formed using the ink jet composition according to claim 4.

14. A recorded matter comprising:
    a recording medium; and
    a recorded portion formed using the ink jet composition according to claim 5.

15. A recorded matter comprising:
    a recording medium; and
    a recorded portion formed using the ink jet composition according to claim 6.

16. A recorded matter comprising:
    a recording medium; and
    a recorded portion formed using the ink jet composition according to claim 7.

17. A recorded matter comprising:
    a recording medium; and
    a recorded portion formed using the ink jet composition according to claim 8.

18. A recorded matter comprising:
a recording medium; and
a recorded portion formed using the ink jet composition according to claim 9.

* * * * *